United States Patent Office 3,480,619
Patented Nov. 25, 1969

3,480,619
KETAL INTERMEDIATE
Bjarte Loken, Shrewsbury, Mass., and Irving V. Sollins, Rye, N.Y., assignors to Phytogen Products, Inc., Mamaroneck, N.Y., a corporation of Delaware
No Drawing. Filed Jan. 19, 1966, Ser. No. 521,545
Int. Cl. C07c 173/00, 169/36; A61k 27/00
U.S. Cl. 260—239.55
7 Claims

ABSTRACT OF THE DISCLOSURE

The present invention relates to a novel steroid compound 5α,17β - dihydroxy - 20-ethylenedioxy-6β-methylpregnan-3-one, to its preparation and to its conversion into progestationally active steroids. This compound is considered to be an important intermediate in steroid chemistry because of its facile transformation into many steriods of known and potential significance.

The present invention relates to 5α,17α-dihydroxy-20-ethylenedioxy-6β-methylpregnan-3-one and certain related compounds.

The compounds in question can be prepared from 17α-hydroxy pregnenolone according to the following formula sequence:

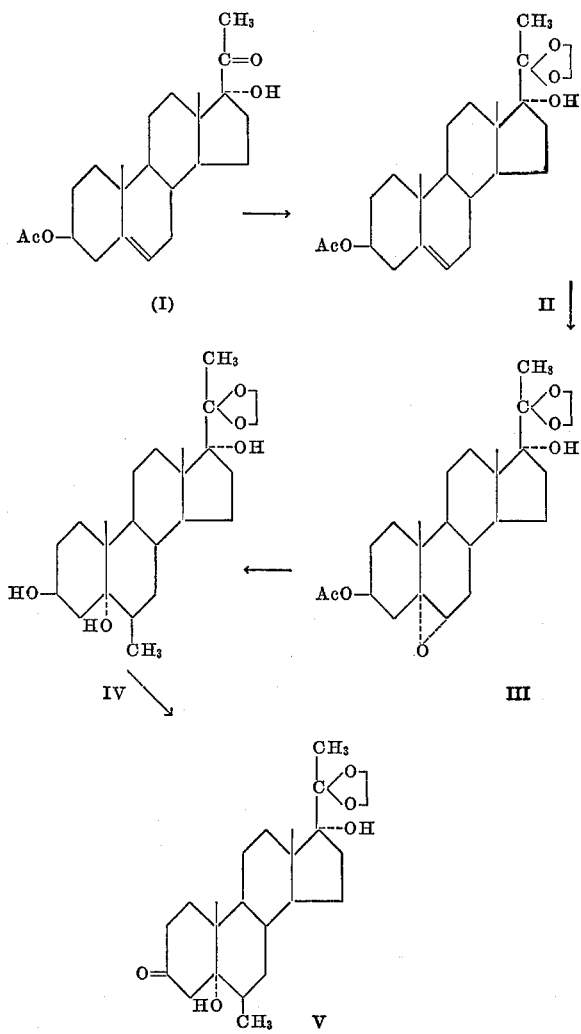

As shown by the formula sequence the 3-mono acylate (preferably 3-acetate) of 17α-hydroxypregnenolone (Formula I) is first converted to the 20 ketal thereof (Formula II) by transketalization with 2-methyl-2-ethyl-1,3-dioxolane. Thereafter the steroid is epoxidized with metachloroperbenzoic acid, a reagent which exclusively causes a 5α-6α-epoxide configuration, and at the same time leaves the 20 ethylene ketal group intact (Formula III). Other organic per-acids (e.g., peracetic, permaleic, perbenzoic, perphthalic) give a somewhat inferior performance. Thereafter a Grignard reaction with methyl magnesium bromide converts the epoxide to a 5α-hydroxy 6α-methyl derivative (Formula IV). Reaction with methyl magnesium iodide or methyl magnesium chloride is almost as effective as with methyl magnesium bromide.

The final product, Formula V, is obtained by oxidation with a chromium trioxide-pyridine complex in pyridine solution according to G. I. Poos et al., J. Am. Chem. Soc. 75, page 422 (1953). This technique has the advantage that oxidative attack of the 3-hydroxy group is absolutely selective and in consequence a good yield of the compound of Formula V is obtained.

The compound of Formula V, i.e., 5α-17α-dihydroxy-20-ethylenedioxy-6α-methylpregnan-3-one is believed to be an important intermediate in steroid chemistry because of its facile transformation into many steroids of known and potential significance. Thus, for example, the compound can be converted to 3,17α-diacetoxy-6-methyl-3,5-pregnadien-20-one simply by heating in an acetic anhydride containing paratoluenesulfonic acid. This enol diacetate is a strong orally active progestational material as referenced in U.S. Patent 2,889,342.

By heating the compound of Formula V in an acetone solution in the presence of a strong mineral acid, it may be converted into 17α-hydroxy-6α-methyl progesterone, known also to be an active progestational agent which, in turn, may be readily acylated at the 17-position to form 17α-acetoxy-6α-methyl progesterone (Provera).

Also, by a two-step procedure, the compound undergoes a facile conversion to 17α-hydroxy-3-ethylenedioxy-6-methyl-preg-5-ene-20-one and its 17-acetate (also a highly active progestational material—cf. applicants copending application Ser. No. 327,072), now Patent 3,248,391. For the 17-hydroxy compound, the 20 ketone structure is first regenerated (from the 20 ketal) by allowing the compound to stand overnight at about ambient (i.e., room) temperature in an acetone solution containing a trace of a strong acid, e.g., p-toluene sulfonic acid, preferably maintaining the solution under agitation. Only the ketal is cleaved; no elimination takes place at the 5α-hydroxy group. The second step which is a combined ketalization and dehydration step may be effected by acid catalyzed reaction with a member selected from the group consisting of 2-methyl-2-ethyl 1,3 dioxolane and 2,2 dimethyl dioxolane. Catalytic (trace to about 1%) quantities of a strong acid such as p-toluene sulfonic acid may serve as the acid catalyst. Suitably, therefore, the second step which leads to selective ketal formation at C–3 is effected by boiling or refluxing in 2-methyl 2-ethyl-1,3-dioxolane in the presence of p-toluenesulfonic acid (H. J. Dauben, B. Löken, H. J. Ringold, J. Am. Chem. Soc. 76, p. 1359 (1956)). The prolonged boiling in this acidic medium at the same time eliminates the 5α-hydroxyl group to form the 5,6 double bond.

17α - acetoxy -3 - ethylenedioxy - 6 - methylpreg - 5-ene-20-one may be formed by first subjecting the compound of Formula V to acetic anhydride containing a trace of p-toluenesulfonic acid at relatively low temperatures. This treatment regenerates the 20 ketone (although some glycol acetate is formed as a side product) by a rapid reaction and subsequently the 17α-hydroxy group is acetylated. Under the reaction conditions no elimination reaction occurs at the 5α-hydroxy, nor is the 5α-hydroxy group acetylated. Thereafter the 5α-hydroxy-17α-acetoxy-3,20- dione is selectively ketalized at the 3-position along with elimination of the 5-OH to form the 5,6 double bond just as described above for the 17α-hydroxy derivative.

In addition, the compound of Formula V has been found suitable as the starting material for 17α-hydroxy-6α-methyl-pregnene-4-ene-20-one and the esters thereof. A Wolff-Kishner reduction is effected thereon. First the hydrozone is formed; then when the carbonyl function at C–3 is reduced to a methylene group, by boiling the hydrozone in a strong solution of potassium hydroxide and ethylene glycol, it has been found (surprisingly enough) that the 5-hydroxy group is eliminated and the product was 17α-hydroxy - 6α - methylpregnene-4-ene-20-one (identical with material prepared by other techniques as in 3,192,202). It is theorized that the elimination must have produced a $\Delta^{3,5}$ enolic amine diene tautomer, or some double bond migration must have taken place from a C–5, 6 to C–4, 5, leading the methyl group to occupy the more stable equatorial 6α position configuration. The 20 ketone is regenerated by conventional acid catalyzed ketal cleavage. If desired, the 17-hydroxy may be acylated.

As above described, 5α,17α-dihydroxy - 20 - ethylenedioxy-6β-methylpregnan-3-one is an intermediate of wide utility. The following formula sequence shows many of the compounds of known activity that can be readily made therefrom by a one- or two-step process.

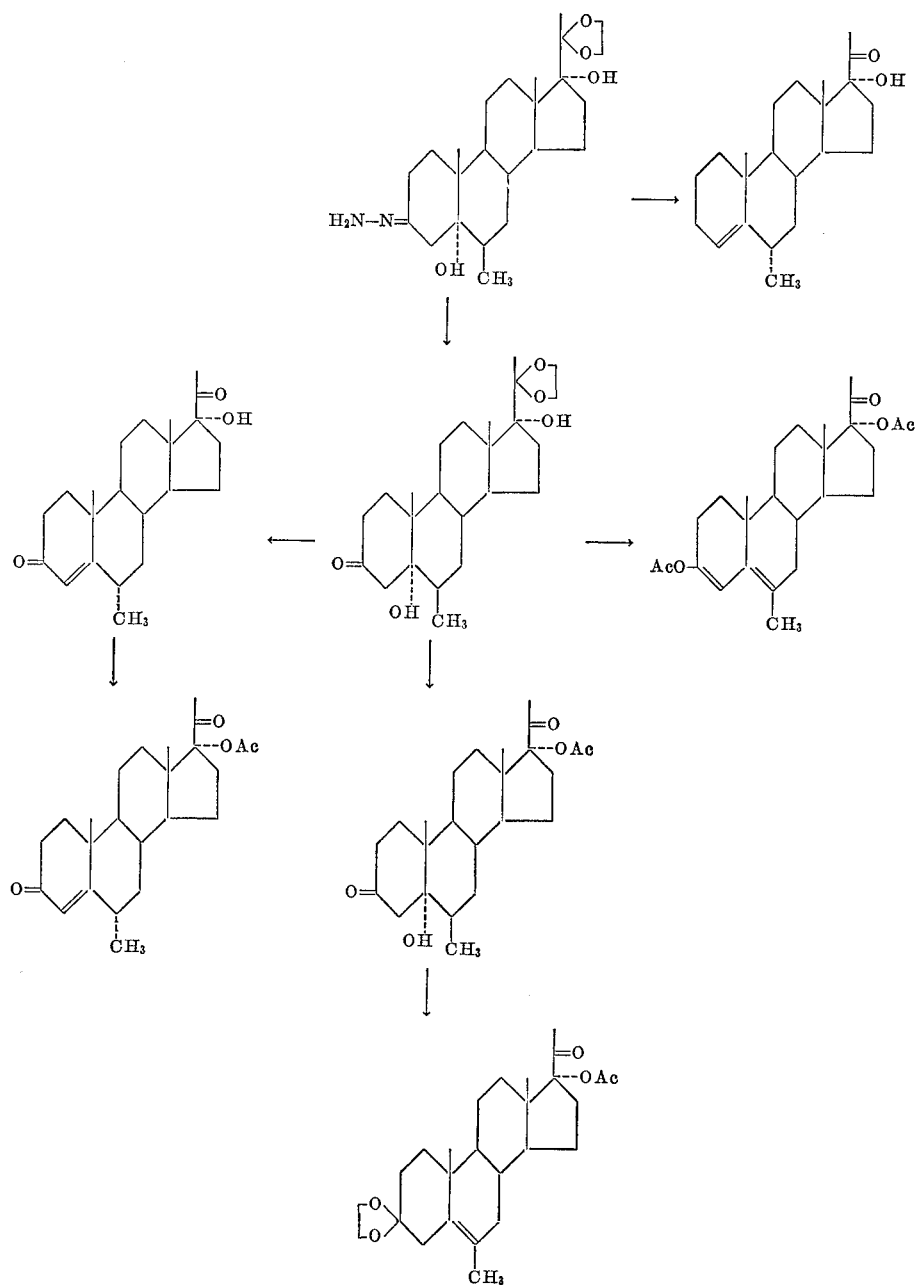

EXAMPLE I

3β-acetoxy-20-ethylenedioxy-pregn-5-en-17α-ol

In a flask equipped with a packed column and a total reflux partial take-off head, a solution of 18 g. of 17α-hydroxy-3β-acetoxypregn - 5 - en - 20 - one in 600 ml. of 2-methyl-2-ethyl-1,3-dioxolane, 11 ml. of ethylene glycol, and 300 mg. of p-toluenesulfonic acid monohydrate maintained at reflux, with two drops of distillate being removed per minute. After seven hours of reaction, the ketalization at the 20-carbonyl function is complete as indicated by a constant 118° C. temperature at the top of the column (the boiling point of the dioxolane). Refractive index analysis and volumetric measurement of the distillate collected showed that butanone in about a 1:1 mol ratio had been formed by the transketalization reaction and removed. The reaction mixture was cooled, washed twice with a 2 N aqueous potassium carbonate solution, and concentrated to dryness under reduced pressure. The residue was triturated with ether, the crystalline solids collected by filtration and dried. The analytical sample was obtained by recrystallization from diethyl ether. A soxhlet extraction apparatus was used for the recrystallization. 17.5 g. of ketal was obtained, M.P. 193–195°, $(\alpha)_D$ —66° (chlf.).

EXAMPLE II

3β-acetoxy-5α,6α-epoxy-20-ethylenedioxypregnan-17α-ol

To a solution containing 12 g. of the 17α-hydroxypregnenolone ketal, 3-acetate product of Example I in 120 ml. of dichloromethane there was added (while cooling in an ice and water bath, under vigorous mechanical agitation) a solution of 6 g. m-chloroperbenzoic acid in 70 ml. of dichloromethane. After about ten minutes of reaction m-chlorobenzoic acid started to precipitate. Stirring of the mixture in the cooling bath was continued for a total of 60 minutes and then the mixture placed in a deepfreeze for an hour. The m-chlorobenzoic acid precipitate was filtered and the filtrate washed twice with two times 200 ml. aqueous 2 N sodium hydroxide solution, dried over anhydrous potassium carbonate, and evaporated to dryness under reduced pressure. The residue was triturated with ether, and the crystals filtered, dried, recrystallized from ether (Soxhlet). Obtained was 11.2 g. of white crystals, M.P. 214–217°, $(\alpha)_D^{24}$ —63.8° (chlf.).

EXAMPLE III 20-ethylenedioxy-6β-methylpregnan-3β,5α,17α-triol

To a solution of 234 ml. of 3 molar methylmagnesium bromide in ether diluted with 23 ml. of toluene there was added (slowly from an addition funnel) a solution of 3 g. of 3β-acetoxy-5α,6α-epoxy - 20 - ethylenedioxypregnan-17α-ol (product of Example II) in 120 ml. toluene. Prior to charging, the equipment was thoroughly flushed with argon (Linde 99.996% assay). An atmosphere of argon was maintained overhead during the addition and the subsequent reflux. About 25 ml. of solvent mixture was distilled off (most of the ether) which served the purpose of adjusting the reaction mixture temperture up to the boiling point of toluene. After completion of the distillation the mixture was refluxed to 26 hours. The reaction mixture was allowed to cool under an argon atmosphere. Then 12 ml. of a saturated (at 25° C.) aqueous solution of ammonium chloride was added slowly, drop by drop, from the addition funnel. Towards the end of the addition the opaque liquid separated in a clear supernatant and a white precipitate of the Mg++ salts. The supernatant was decanted through a filter and the solids extracted with three portions each of ether, and the extract decanted through the same filter. The combined filtrates were concentrated to dryness under reduced pressure. The residue was recrystallized from ether and gave 2.4 g. of white crystals, M.P. 182–185°, $(\alpha)_D^{24}$ —68.2° (chlf.).

EXAMPLE IV

5α,17α-dihydroxy-20-ethylenedioxy-6β-methylpregnan-3-one (1)

A solution 1.5 g. of the triol product of Example III in 15 ml. of pyridine was combined with a stirred yellow suspension of 1.5 g. chromium trioxide in 15 ml. of pyridine. The reaction flask was stoppered, the contents mixed thoroughly, then allowed to stand at room temperature overnight (17 hours). Thereafter the reaction mixture was poured into water, filtered and dried. The dark brown powder was extracted with dichloromethane. The extract was evaporated to dryness under reduced pressure and triturated with ether. 1.0 g. of slightly cream colored crystals were obtained. One crystallization provided the analytical sample showing M.P. 246–248.5°, $$(\alpha)_D^{24} = -20.8°$$

(chlf.).

EXAMPLE V

Wolff-Kishner reduction to 17α-hydroxy-6α-methylpregn-4-en-20-one

To a mixture of 50 ml. diethylene glycol, 2.5 g. of potassium hydroxide and 3.0 ml. of hydrazine hydrate was added 4.0 g. of 5α,17α-dihydroxy-20-ethylenedioxy-6β-methylpregnan-3-one. The mixture obtained was heated with agitation at a temperature of 115° C. for about one hour. The water which formed as a result of the reaction was continuously removed as vapors, by letting an even and slow stream of argon pass through the flask (not equipped with a condenser). The mixture was then heated to about 200° C., that temperature maintained for about 35–40 minutes, then cooled to about room temperature after which 300 ml. of ice and water was added. The solids were filtered, washed with water, dried, and recrystallized from ether to give 17α-hydroxy-6α-methylpregn-4-en-20-one, M.P. 183–185°, $$\lambda_{max.}^{KBr}$$

2.90, 5.90, 7.40, 9.10, 12.40μ.

The 17-acetate was obtained by letting the 17-hydroxy product (2 g.) stand overnight at 30–35° C. with acetic anhydride (20 ml.) containing 200 mg. of p-toluenesulfonic acid monohydrate. This mixture was poured on ice and agitated for one day, and the crude precipitate filtered and recrystallized from methanol. There was obtained 1.8 g. of 17α - acetoxy - 6α - methylpregn - 4-en - 20 - one, M.P. about 167–170°.

Both the 17-hydroxy derivative and the 17-acetate were found to be identical (by mixed melting point and infrared comparison) with the respective substances obtained by Raney Nickel hydrogenolysis of the appropriate 3-ethylene thioketal (Ref.: George Kaumas, Irving Scheer, U.S. Patent 3,192,202, June 29, 1965; Irving Scheer, U.S. Patent 3,162,629, Dec. 22, 1964).

EXAMPLE VI

17α-hydroxy-3-ethylenedioxy-6-methylpregn-5-en-20-one

To a suspension of 1.0 g. of 5α,17α-dihydroxy-20-ethylene-dioxy-6β-methylpregnan-3-one in 50 ml. of acetone was added 50 mg. of p-toluenesulfonic acid monohydrate, and the mixture left overnight (20 hours) under agitation at 20° C. Two drops of diethylamine were added and the mixture concentrated under reduced pressure to a small volume (ca. 15 ml.). Cautious addition of water precipitated the crude deketalized product which was filtered and dried. Infrared measurements did not indicate presence of any ketal band, nor many α,β-unsaturated carbonyl. The material was dissolved in 25 ml. of 2-methyl-2-ethyl-1,3-dioxolane, and 60 mg. p-toluenesulfonic acid added. The resulting solution was heated to boiling in a flask equipped with a packed column having a total reflux partial take-off head corresponding to about 40- theoretical plates under total reflux. Initially the column was maintained at a reflux ratio of about 1:8 (the first two hours), then at 1:60 overnight (17 hours). The following morning the solution was cooled, transferred to a separatory funnel and washed twice with 25 ml. portions of 2 N sodium carbonate solution. The methylethyldioxolane layer was dried over anhydrous potassium carbonate and concentrated to dryness in vacuo. The crystalline residue was transferred to a Soxhlet thimble and extracted exhaustively with ether. Concentration of the extract to a small volume gave 760 mg. of crystals, M.P. 213–215°, $(\alpha)_D$, −70.4° (chlf), which by mixed melting point determination and infrared comparison was found to be identical with 17α-hydroxy-3-ethylenedioxy-6-methylpregn-5-en-20-one, prepared in other fashion.

EXAMPLE VII

17α-acetoxy-3-ethylenedioxy-6-methylpregn-5-en-20-one

To suspension of 1.0 g. of 5α,17α-dihydroxy-20-ethylenedioxy-6β-methylpregnan-3-one in 50 ml. of acetic anhydride was added 50 mg. of p-toluenesulfonic acid monohydrate, and the mixture agitated at 0–5° C. for four days. The mixture was then poured on 800 g. of crushed ice and stirred for 24 hours. The reaction product was kept in a cold room during this stirring period and only about half of the ice melted. The granular product which formed was filtered, washed with water (until the ice melted), resuspended in 2 N aqueous potassium carbonate solution, refiltered, washed with water to neutrality, and dried. Infrared measurement indicated that the ketal had cleaved and that the 20-ketone had been reformed. The 17-hydroxy had been acetylated but the 5-hydroxy remained intact. This product was ketalized with 2-methyl-20-ethyl-1,3-dioxolane in the presence of p-toluenesulfonic acid according to the procedure described in Example VI to give 800 mg. of a substance, M.P. 188–190°, $(\alpha)_D$ −48° (chlf.), which by mixed melting point determination and infrared comparison was found to be identical with 17α-acetoxy-3-ethylenedioxy-6-methylpregn-5-en-20-one prepared by other techniques.

What is claimed is:
1. A compound which is

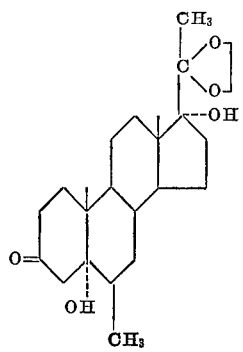

2. An esterifying and ketal cleaving procedure which comprises agitating a mixture of 5α,17α-dihydroxy - 20- ethylenedioxy - 6β - methylpregnan-3-one and acetic anhydride at below ambient temperature in the presence of catalytic quantities of p-toluenesulfonic acid whereby the corresponding 5α-hydroxy-17α-acetoxy-20-keto steroid is formed.

3. A one-step procedure for converting compounds of the formula

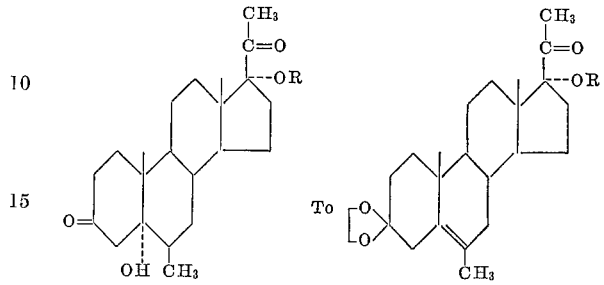

where R is H or acetate; which comprises reacting the starting compound with an excess of a member of the group selected from 2-methyl-2-ethyl-1,3 dioxolane and 2,2-dimethyldioxolane in the presence of an acid catalyst.

4. The procedure of claim 3 wherein the reaction is effected in 2-methyl-2-ethyl-1,3 dioxolane in the presence of catalytic amounts of p-toluene sulfonic acid.

5. A procedure wherein 5α,17α - dihydroxy - 20-ethylenedioxy - 6β - methylpregnane-3-one is treated in acetone solution with a trace of a strong acid to regenerate the 20-ketone and is then treated with a compound selected from the group consisting of 2-methyl-2-ethyl-1,3 dioxolane and 2,2-dimethyl dioxolane in the presence of not more than about 1% of an acid catalyst to form 17α-hydroxy - 3 - ethylenedioxy - 6 - methylpregn-5-ene-20-one.

6. A procedure wherein 5α-17α-dihydroxy - 20 - ethylenedioxy-6β-methylpregnane-3-one is treated with acetic anhydride in the presence of an acid catalyst and is then treated with a compound selected from the group consisting of 2-methyl-2-ethyl-1,3-dioxolane and 2,2-dimethyl dioxolane in the presence of not more than about 1% of an acid catalyst to form 17α - acetoxy-3-ethylenedioxy-6-methylpreg-5-ene-20-one 7. A process wherein 5α,17α - dihydroxy - 20 - ethylenedioxy - 6β - methylpregnan-3-one is treated in the presence of a strong alkali with a hydrazine derivative selected from group consisting of acetate, hydrate, sulfate and anhydride, then hydrolyzing the resultant ketal in the presence of an acid catalyst.

References Cited

UNITED STATES PATENTS

| | | | |
|---|---|---|---|
| 3,061,607 | 10/1962 | Oliveto et al. | 260—239.55 |
| 3,061,616 | 10/1962 | Camerino et al. | 260—397.4 |
| 3,096,350 | 7/1963 | Iriarte et al. | 260—397.4 |
| 3,099,657 | 7/1963 | Zderic et al. | 260—239.55 |
| 3,155,695 | 11/1964 | Bowers et al. | 260—397.45 |

OTHER REFERENCES

Djerassi, Steroid Reactions (1963) pp. 10 and 94.

HENRY A. FRENCH, Primary Examiner

U.S. Cl. X.R.

260—397.4, 999